US009680340B2

(12) United States Patent
Noack et al.

(10) Patent No.: US 9,680,340 B2
(45) Date of Patent: Jun. 13, 2017

(54) ELECTRICALLY ROTATING MACHINE

(71) Applicant: SIEMENS AKTIENGESELLSCHAFT, München (DE)

(72) Inventors: Felix Noack, Nürnberg (DE); Zdenek Spera, Feucht (DE); Christoph Stuckmann, Postbauer-Heng (DE); Sebastian Weiss, Oberasbach (DE)

(73) Assignee: SIEMENS AKTEINGESELLSCHAFT, München (DE)

( * ) Notice: Subject to any disclaimer, the term of this patent is extended or adjusted under 35 U.S.C. 154(b) by 141 days.

(21) Appl. No.: 14/651,118

(22) PCT Filed: Nov. 28, 2013

(86) PCT No.: PCT/EP2013/074939
§ 371 (c)(1),
(2) Date: Jun. 10, 2015

(87) PCT Pub. No.: WO2014/090580
PCT Pub. Date: Jun. 19, 2014

(65) Prior Publication Data
US 2015/0318749 A1 Nov. 5, 2015

(30) Foreign Application Priority Data
Dec. 11, 2012 (EP) .................................. 12196486

(51) Int. Cl.
H02K 1/32 (2006.01)
H02K 1/20 (2006.01)
(Continued)

(52) U.S. Cl.
CPC ................ H02K 1/20 (2013.01); H02K 1/32 (2013.01); H02K 9/06 (2013.01); H02K 9/08 (2013.01); H02K 2201/03 (2013.01)

(58) Field of Classification Search
CPC .. H02K 9/06; H02K 9/08; H02K 1/20; H02K 1/32
(Continued)

(56) References Cited

U.S. PATENT DOCUMENTS 3,110,827 A    11/1963  Baudry
4,301,386 A *  11/1981  Schweder ................ H02K 1/32
                                                   310/211
(Continued)

FOREIGN PATENT DOCUMENTS

CH              461617 A     8/1968
DE     10 2008 033 959 A1    2/2010

Primary Examiner — Terrance Kenerly
(74) Attorney, Agent, or Firm — Henry M. Feiereisen LLC

(57) ABSTRACT

An electrically rotating machine, includes a rotor and a stator, the rotor and/or the stator including a laminated core, with an air gap being formed between the rotor and the stator, said rotor having axially and radially extending cooling paths in flow communication with each other and in flow communication with radially extending cooling paths of the stator via the air gap, wherein the radially extending cooling paths of the stator are respectively axially aligned with the radially extending cooling paths of the rotor; at least one fan for conducting an air flow through the axially and radially extending cooling paths of the rotor, the air gap and the cooling paths of the stator, wherein the air gap has at least one constriction defined by sheets of the laminated core of the rotor having an outer radius greater than remaining ones of the sheets of the laminated core of the rotor and/or by sheets of the laminated core of the stator having a smaller inner radius than remaining ones of the sheets of the laminated core of the stator.

4 Claims, 2 Drawing Sheets

(51) Int. Cl.
*H02K 9/06* (2006.01)
*H02K 9/08* (2006.01)

(58) Field of Classification Search
USPC .................................................. 310/58, 59
See application file for complete search history.

(56) References Cited

U.S. PATENT DOCUMENTS

| | | | |
|---|---|---|---|
| 4,341,966 A * | 7/1982 | Pangburn | H02K 17/16 310/61 |
| 4,365,178 A * | 12/1982 | Lenz | H02K 1/32 310/216.053 |
| 4,845,394 A * | 7/1989 | Kleinhans | H02K 9/18 165/903 |
| 8,026,643 B2 | 9/2011 | Weiss et al. | |
| 8,283,817 B2 | 10/2012 | Weiss et al. | |
| 8,405,261 B2 | 3/2013 | Hümer et al. | |
| 8,519,580 B2 | 8/2013 | Brandl et al. | |
| 8,614,528 B2 | 12/2013 | Eichinger et al. | |
| 2005/0151430 A1 | 7/2005 | Lowther | |
| 2009/0230790 A1 | 9/2009 | Weiss et al. | |
| 2011/0006622 A1 | 1/2011 | Weiss et al. | |
| 2011/0031831 A1 | 2/2011 | Hümer et al. | |
| 2011/0127862 A1 | 6/2011 | Eichinger et al. | |
| 2011/0140550 A1 | 6/2011 | Brandl et al. | |
| 2011/0181137 A1* | 7/2011 | Kori | H02K 9/12 310/59 |
| 2014/0028124 A1 | 1/2014 | Noack et al. | |

* cited by examiner

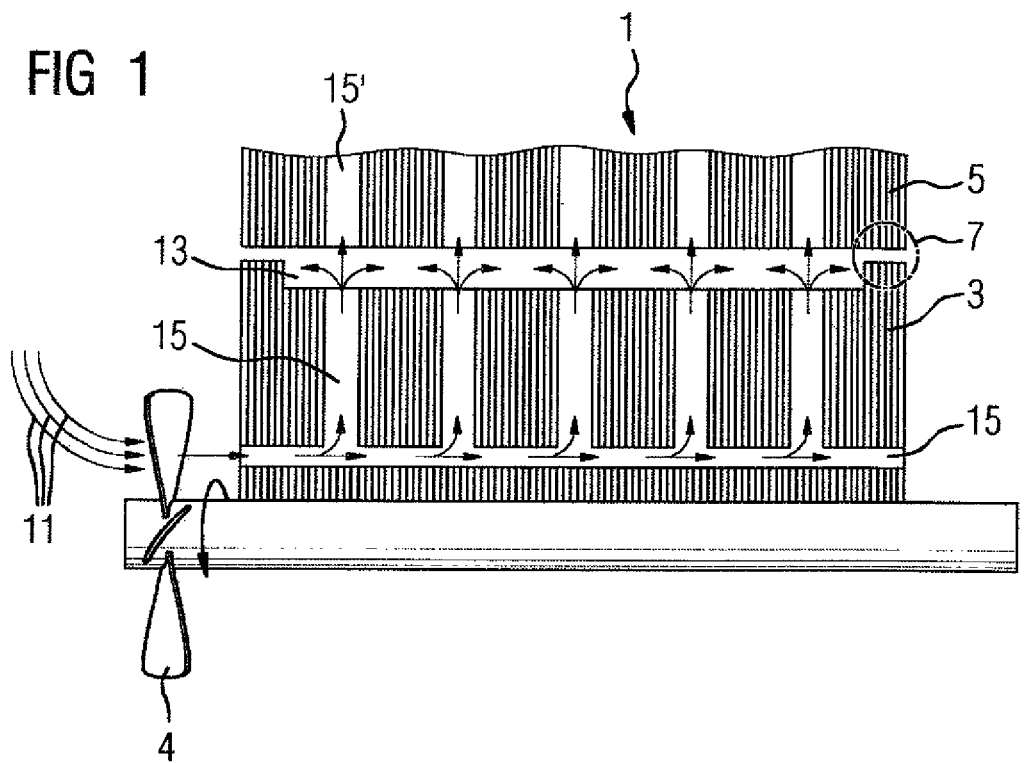
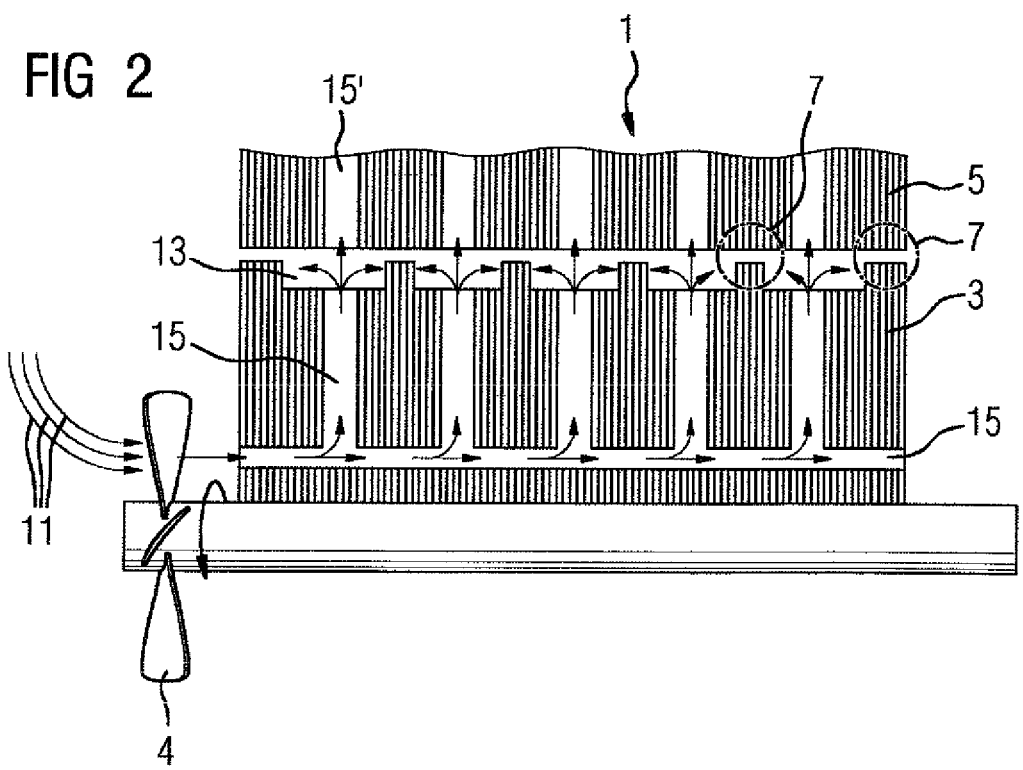

ELECTRICALLY ROTATING MACHINE

CROSS-REFERENCES TO RELATED APPLICATIONS

This application is the U.S. National Stage of International Application No. PCT/EP2013/074939, filed Nov. 28, 2013, which designated the United States and has been published as International Publication No. WO 2014/090580 A1 and which claims the priority of European Patent Application, Serial No. 12196486.0, filed Dec. 11, 2012, pursuant to 35 U.S.C. 119(a)-(d).

BACKGROUND OF THE INVENTION

The invention relates to electrically rotating machines.

Electric motors or generators for producing electrical power have windings through which current passes. These run in a rotor and/or a stator. The rotor and/or the stator consists, if windings run herein, substantially of a laminated core. Laminated cores are composed of sheets stacked one on top of the other and produced in most instances by means of a stamping process. The sheets are firmly held together using a fastening mechanism, for instance a screwed connection. The windings through which current passes heat up during operation of the electrically rotating machine and emit a large part of their heat onto the laminated core. There is therefore the need to cool these laminated cores. In order to cool the laminated core, air can flow through cooling paths in the laminated core in order to absorb the excess heat. The air flow often passes through cooling paths in the rotor, which open out into cooling paths in the stator. After passing through the cooling paths of the stator, the air flow is in most cases emitted into the environment. These cooling paths begin in the rotor and conduct the air flow outwards through an air gap between the outer side of the rotor and the inner side of the stator into the adjoining cooling paths. If the gap on the end faces of the rotor and/or of the stator is not constricted, a significant part of the air flow escapes through this air gap between the rotor and the stator before it reaches the cooling paths of the stator.

The Swiss Patent application No. 461617 discloses that the gap between a rotor and a stator of an electrically rotating machine can be constricted by means of rings, in order to prevent the lateral escape of a cooling gas through the axially running air gap.

SUMMARY OF THE INVENTION

The object underlying the invention is to improve the cooling of an electrically rotating machine.

This object is achieved in the case of an electrically rotating machine of the type mentioned in the introduction in that the electrically rotating machine has at least one constriction of the air gap, which is formed by an enlargement of the external radii of sheets of the laminated core of the rotor and/or by reducing the internal radius of sheets of the laminated core of the stator.

An air flow, which runs through the cooling paths through the rotor and via the air gap through the stator is reduced by means of a loss which occurs at the transition between the cooling paths of the rotor and of the stator. In this case a small part of the air escapes through the air gap and leaves the air gap in the axial direction between the rotor and the stator. An inventive constriction of the air gap, for instance close to the outer sides of the air gap, brings about a reduced escape of the air flow at the outer sides and thus contributes to an improvement in the cooling of the stator. The proportion of air flow which escapes through the air gap only contributes to a reduced degree to the cooling of the stator.

Adequate cooling of the individual components is necessary for undisturbed operation and a high degree of efficiency of the machine. To further improve the cooling, it is advantageous to attach a fan to the front side and the rear side in each instance. Therefore support of the airflow through the further fan can either take place on the other side of the rotor if both fans generate a parallel air flow in the same direction. Depending on the construction, two parallel air flows which run in the opposing direction may also be advantageous. The air flows running in different directions result if applicable in the flow passing through the radially running cooling paths several times, said cooling paths being located in the central region of the rotor and the stator. A variable flow speed from one of the air flows allows this region to be explicitly set. Since the radial distance between the rotor and the stator (equating to the height of the air gap) in the case of electrically rotating machines, especially in electric motors or generators, is very small compared with the remaining sizes of the laminated core or cores themselves, the percentual change is radii in the lower adjusted region which is changed for the constriction. A small change in the radii of sheets of this type only produces a small change in the magnetic field. A substantial advantage in a constriction of the air gap due to the change in radii of some sheets consists in the simplified manufacture of the laminated core, since, compared with the current prior art, no additional elements have to be fastened to the laminated core. Furthermore, such a laminated core has increased stability compared with a laminated core with an additional element, for instance a ring.

With an advantageous embodiment of the electrically rotating machine, provision is made for a constriction of the air gap in each instance close to the outer sides of the rotor or of the stator. A constriction close to the outer side of the laminated core or the laminated cores in most cases produces an adequate reduction in the disadvantageous escape of air flow through the air gap. Since the air flow is freely movable in the region between the two constrictions, a build-up of heat in individual regions of the stator or rotor is prevented.

Furthermore, air spreads almost unobstructed through the inner region of the air flow. This results in an equal cooling of the rotor and of the stator in the axial direction. An if applicable imbalance in the distribution of the air flow on the individual cooling paths is thus balanced out in part. The localization of the constriction on the outer side of the air gap between the rotor and the stator only produces a small change in the manufacturing process, since only a small number of sheets have to be modified. If a modification to the manufacturing process is difficult, the sheets with radii which deviate from the radii of the sheet of the unmodified laminated core, can be manufactured separately and subsequently integrated into the laminated core.

With a further advantageous embodiment, the constriction is distributed such that the air gap is constricted in each instance in regions which run radially with respect to the rotor axis, between which the cooling paths cross the air gap. With this shape, constrictions in the air gap are generated both in the edge region and also therebetween by means of a change in the corresponding radii of the corresponding sheets in the laminated core. The constrictions are arranged for instance in such a way that individual cooling paths of two constrictions are partly separated from the remaining air gap in each instance. These constrictions which are advantageously disposed in direct proximity to the cooling path result in an improved cross-over of the air flow from the rotor to the stator. Since this embodiment has several constrictions and each constriction represents an obstruction to the air flow through the air gap, the efficiency of the passage of the air flow from the rotor to the stator is optimized here still further. The deliberate cross-over of the air flow from the rotor to the stator provides for an improved cooling of the stator, particularly in the radial direction compared with a cross-over through an air gap, which has no constrictions between the individual transitions of the cooling paths through the air gap.

In a further advantageous embodiment, the constriction of the air gap is produced in part from a change, region by region, in the radii of the sheets of the laminated core of the rotor and/or stator, and by fixing at least one ring or a flexible band in this region, wherein the ring or the flexible band is fixed to the stator and/or to the rotor. If the electrically rotating machine is exposed to the effect of external forces or an impulse during its use, there is the possibility of the rotor briefly changing its axis of rotation if necessary compared with the stator. This change may result particularly in the region of the constriction of the air gap in the stator and rotor touching during operation and thus in material abrasion. In the case of metallic surfaces, which rub against one another in this case, metallic particles in the electrically rotating machine assume a significant hazard potential for the electrically rotating machine. A blocking of the rotor or a short circuit may be the result of metallic particles in the electrically rotating machine. In order to minimize this hazard potential, at least one thin ring in the region of a constricted air gap is intended to prevent the abrasion of metallic particles. The ring here is best manufactured from an organic material, like for instance a plastic.

Alternatively, a wrapping with a flexible band can also take place instead of a solid ring. This band may also comprise a textile structure. Unevennesses in the outer surfaces of the rotor and/or stator can also be balanced out by means of additional rings. If the thus prepared inner surfaces of the air gap actually touch, the coefficients of friction between the plastics are generally lower than the coefficients of friction between metallic surfaces.

These smaller coefficients of friction result in a reduced tendency to block the rotor with a brief change in the axis of rotation of the rotor. In addition, the ring or the flexible band can be used to balance out any inaccuracies in the surface quality or the radii of the laminated core, especially in the regions of the constriction.

BRIEF DESCRIPTION OF THE DRAWING

The invention is described and explained in more detail below with reference to the exemplary embodiments illustrated in the figures, in which;

FIG. 1 shows a cutout of an electrically rotating machine with a laterally restricted air gap, FIG. 2 shows a cutout of an electrically rotating machine with a number of constrictions of the air gap.

DETAILED DESCRIPTION OF PREFERRED EMBODIMENTS

Figure 3:
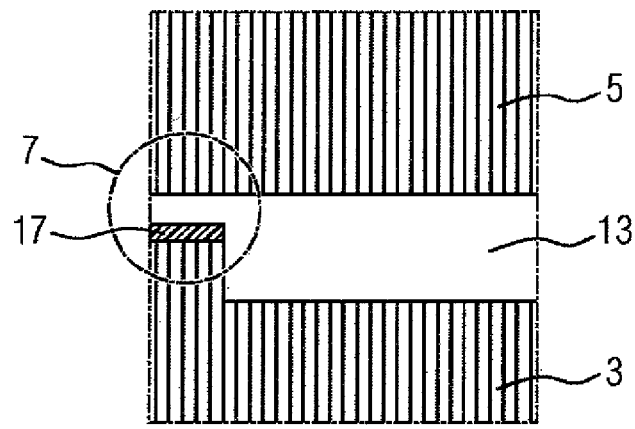
FIG. 3 shows a further exemplary embodiment of the constriction of an air gap.

FIG. 1 shows a cutout of an electrically rotating machine 1 with laterally arranged constrictions 7 of the air gap 13. This Figure shows the rotor comprising the laminated core 3, which has a cooling path 15 running axially and five cooling paths 15 running radially.

In addition a fan 4 which is connected to the axis of rotation is also disposed on one side. The laminated core 5 of the stator which is likewise provided with cooling paths 15' is disposed in cutouts arranged thereabove. The cooling paths 15 of the rotor and the cooling paths 15' of the stator are arranged one above the other and cross the air gap 13 which is arranged between the laminated core 3 of the rotor and the laminated core 5 of the stator. The cooling paths 15, 15' herewith cross the air gap 13 in the orthogonal direction. It is however also conceivable for an acute angle and/or an obtuse angle to exist between the air gap 13 and the cooling paths 15, 15'. The air flow 11 is generated by the fan 4, close to the axis of rotation. In this figure, the air flow 11 is symbolized by arrows. The air flow 11 is generated by the fan 4 and runs through the radial part of the cooling path 15 into the individual cooling paths 15 of the rotor running axially. The air flow 11 in the cooling path 15 of the rotor subsequently crosses the air gap 13 between the laminated core 3 of the rotor and the laminated core 5 of the stator and opens into the cooling paths 15' of the stator disposed thereabove.

The air flow 11 thus passes through the cooling paths 15 of the stator outwards and thus contributes to cooling the laminated core 3 of the rotor and in particular to cooling the laminated core 5 of the stator. A constriction 7 in the cooling gap 13 is visible when arranged laterally. The constriction 7 is produced by enlarging the radii of the sheets, which are disposed in the edge regions of the laminated core 3 of the rotor. It is also possible not to change the radii of the sheets of the laminated core 3 of the rotor and therefore to reduce the inner radii of the corresponding sheets in the laminated core 5 of the stator so that in this case a constriction 7 also occurs here in the edge region of the air gap 13. The advantage of this construction compared with the prior art consists in the high stability of the laminated core 3 of the rotor, since no fastenings of additional elements are required in order to produce a constriction 7. The constriction 7 allows the air flow 11 to be largely retained in the air gap 13, and said air flow can thus be conducted highly efficiently from the cooling path 15 of the rotor into the cooling path 15' of the stator. The flow resistance of the constriction 7 is herewith the crucial feature. Since the flow resistance increases significantly in the region of a constriction 7, a small constriction 7 in the air gap 13 thus already produces a large effect. This constriction 7 results in increased efficiency of the cross-over of the air flow from the laminated core 3 of the rotor into the laminated core 5 of the stator and thus contributes to an improved cooling of the laminated core 5 of the stator. In addition, further fans 4' can also be fastened to the rotor and provide for a further air flow 11' into the axially running part of the cooling path 15 and further into the radially running cooling paths 15, 15'.

FIG. 2 shows a cutout of an electrically rotating machine 1 with a number of constrictions 7 of the air gap 13. With this embodiment, a constriction 7 is present on the laminated core 3 of the rotor in each case between two cooling paths 15, 15' which cross the air gap 13. These constrictions 7 are produced by sheets, the radii of which are enlarged by comparison with the other sheets. In this embodiment the air flow also passes through the cooling path 15 of the rotor and opens into the cooling paths 15' of the stator.

The air flow 11 is herewith also localized on the constricted region of the air gap between the adjacent constrictions 7 and enters into the cooling path 15' of the stator to an increased degree. Depending on the heat distribution, the internal constrictions 7 of the air gap 13 can be adjusted in terms of enlarging the corresponding radii and in terms of their position. It is also possible in this case to produce the constrictions 7 by reducing the internal radii of individual sheets of the laminated core 5 of the stator. The advantage of this embodiment lies in the improved cross-over of the air flow 11 from the cooling paths 15 of the rotor into the cooling path 15' of the stator by comparison with the exemplary embodiment described in FIG. 1. It is also possible to dispense with individual constrictions 7 between the cooling paths, if this is advantageous in respect of the existing magnetic field in one of the laminated cores 3, 5. In addition, in an advantageous embodiment, the constrictions 7 between the individual cooling paths 15, 15' cannot be selected to be too narrow in order if necessary to not entirely prevent a cooling effect of the air flow 11 in the inner region of the air gap. By contrast, the outer constrictions 7 of the air gap 13 are usually to be embodied so as to prevent the escape of air flow 11, 11' at the sides.

FIG. 3 shows a further possibility for the constriction 7 of the air gap 13 between the laminated cores 3, 5. In this case, the laminated core 3 of the rotor and the laminated core 5 of the stator are drawn as lying one above the other. The hatching of the laminated cores 3, 5 is to symbolize the alignment of the individual sheets of the laminated core 3, 5. Here the constriction 7 of the air gap 13 consists in part of an enlargement, region by region, of the radii of some sheets of a laminated core 3, 5 and on the other hand of a ring 17. This constriction 7 is drawn as a cutout on the one side, so that allowance can be made in the both possibilities for the constriction 7 to be localized on one of the edges of the laminated cores 3, 5 or in a region in the center of the air gap 13. The ring 17 can either consist here of a solid matter (like for instance a plastic or aluminum) or a flexible band. In the case of a flexible band, the adhesive connection is advantageous. In the case of a solid ring 17, a force-fit connection or an adhesive connection is particularly suitable for instance. The embodiment with a flexible band is preferable for the majority of applications, since here the degree of the constriction 7 can be easily adjusted to the tolerances which may occur. In addition, a particularly thin ring 7 can thus be realized. The application of a thin flexible band can also be embodied as a coating of the laminated core 3, 5 and may if necessary run across a larger region than that which is predetermined by the constriction 7.

Figure 4:
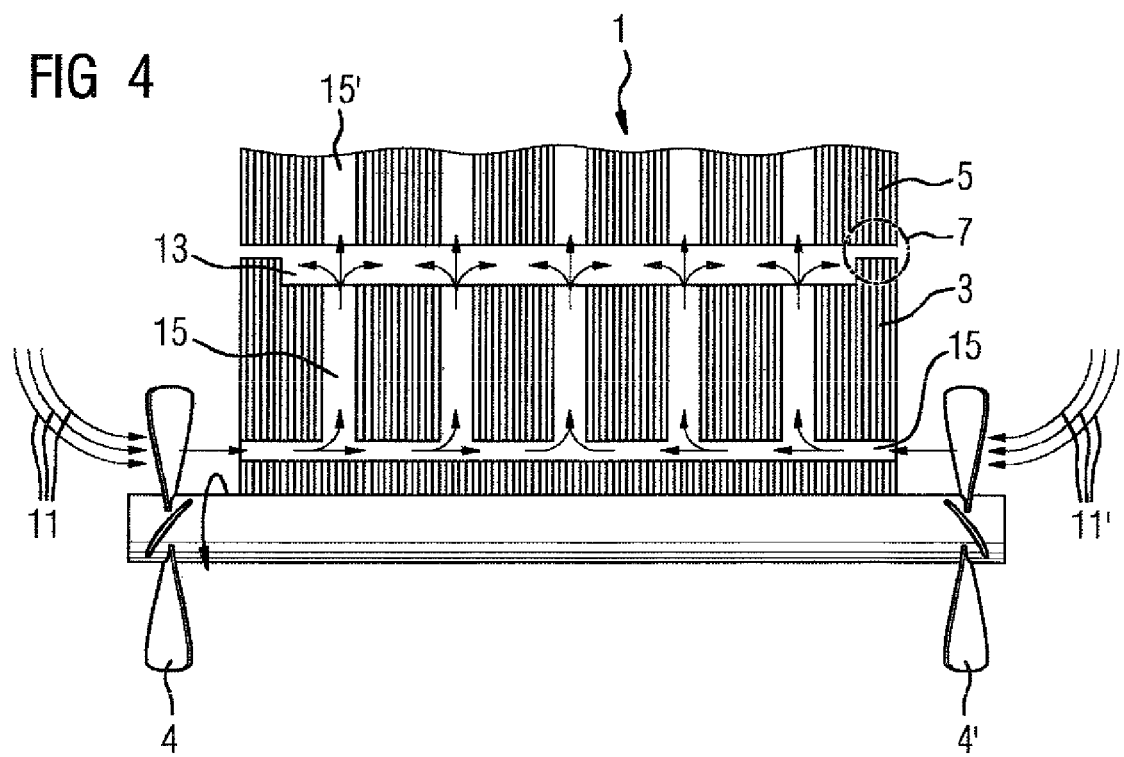
FIG. 4 shows a cutout of an electrically rotating machine with two fans.

FIG. 4 shows a cutout of an electrically rotating machine 1 with two fans 4, 4'. This figure is identical to FIG. 1 except for a further fan 4' and an air flow 11, 11' which have changed as a result. In this figure, the air flows 11, 11' run in opposite directions. This interaction of both air flows 11, 11' in the part of the cooling path 15 running axially specifies a higher air flow in those cooling paths 15, 15' which are localized centrally in the laminated core 3, 5. This increased air flow 11, 11' is symbolized by the longer arrow in the central cooling path 15, 15'. If the fans 4, 4' are dimensioned differently, the air flow 11, 11' can be easily guided into the cooling paths 15, 15' which pass through regions which have to be more intensively cooled down.

In summary, the invention relates to an electrically rotating machine 1 comprising at least one laminated core 3, 5 and at least one fan 4, 4' for conducting an air flow 11, 11' through axially running cooling paths 15 in a rotor of the electrically rotating machine 1 along cooling paths 15, 15' which run radially through the laminated core 3 of the rotor and the laminated core 5 of the stator. Here the cooling paths 15, 15' are interrupted by an air gap 13 disposed between the rotor and the stator. In order to reduce the reduction in the air flow 11, 11' through the air gap 13, the air gap 13 is provided with a construction 7 in at least one location. Thus, a deliberate cross-over of the air flow 11, 11' between the cooling paths 15, 15' through the air gap 13 is ensured. The constriction 7 is produced by enlarging the outer radii of the sheets of the laminated core 3 of the rotor and/or by reducing the inner radius of sheets of the laminated core 5 of the stator. In addition, the constriction can be additionally constricted by means of a ring 17 or a flexible band.

What is claimed is:

1. An electrically rotating machine, comprising:
   a rotor and a stator, said rotor and/or said stator comprising a laminated core, with an air gap being formed between the rotor and the stator,
   said rotor having axially and radially extending cooling paths in flow communication with each other and in flow communication with radially extending cooling paths of the stator via the air gap, said radially extending cooling paths of the stator being respectively axially aligned with the radially extending cooling paths of the rotor;
   at least one fan for conducting an air flow through the axially and radially extending cooling paths of the rotor, the air gap and the radially extending cooling paths of the stator,
   said air gap having at least one constriction defined by sheets of the laminated core of the rotor having an outer radius greater than remaining ones of the sheets of the laminated core of the rotor and/or by sheets of the laminated core of the stator having a smaller inner radius than remaining sheets of the laminated core of the stator; and
   at least one ring or a flexible band provided on an outer circumference of the sheets of the laminated core of the rotor having the greater outer radius, and/or on an inner circumference of the sheets of the laminated core of the stator having the smaller inner radius.

2. The electrically rotating machine of claim 1, wherein the constriction of the air gap is formed in proximity to an end face of the rotor or of the stator.

3. The electrically rotating machine of claim 1, wherein the constriction is formed axially between the radially extending cooling paths of the rotor and the radially extending cooling paths of the stator.

4. The electrically rotating machine of claim 1, wherein the electrically rotating machine is constructed as an electric motor or as a generator.

* * * * *